May 17, 1927.
C. E. DAWSON
1,629,439
WINDSHIELD CONSTRUCTION
Filed Feb. 4, 1924
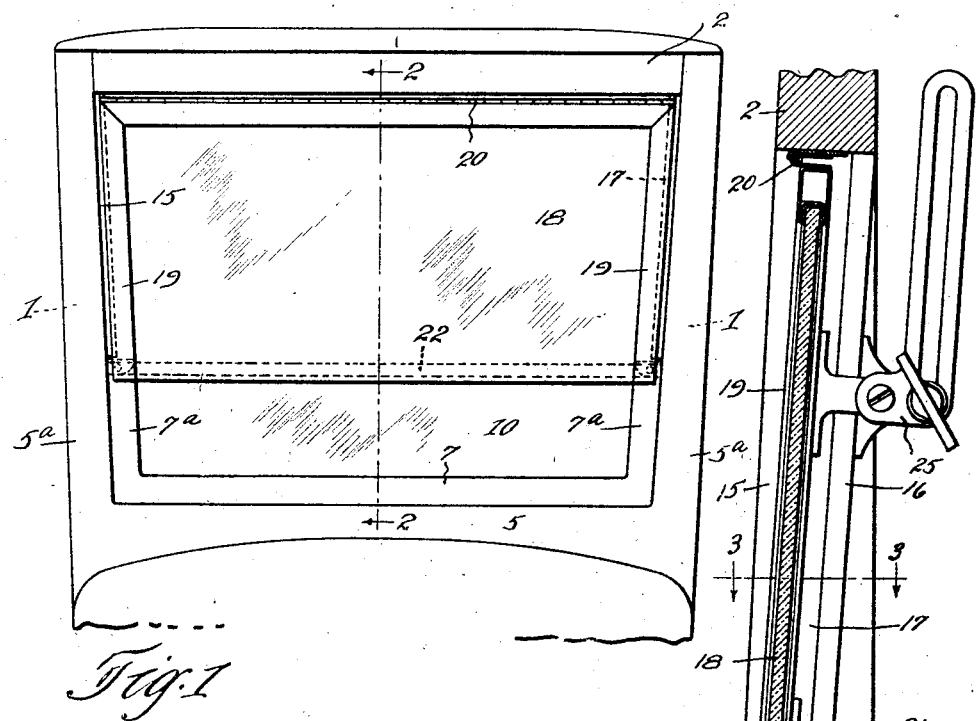
Fig. 1
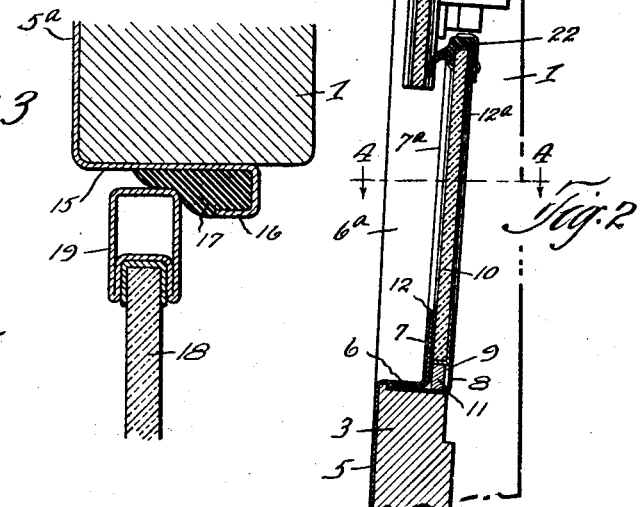
Fig. 2
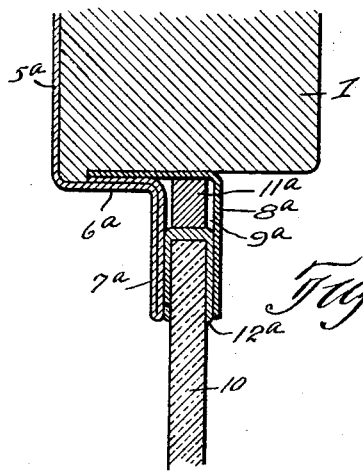
Fig. 3
Fig. 4
Inventor
Carl E. Dawson
by Stull, Brock & West
Attorneys Patented May 17, 1927.

1,629,439

UNITED STATES PATENT OFFICE.

CARL E. DAWSON, OF LAKEWOOD, OHIO, ASSIGNOR TO THE OHIO BODY & BLOWER COMPANY, OF CLEVELAND, OHIO, A CORPORATION OF OHIO.

WINDSHIELD CONSTRUCTION.

Application filed February 4, 1924. Serial No. 690,341.

This invention relates to improvements in automobile body construction and more particularly to the windshield construction of enclosed bodies.

The objects of the invention are to provide an efficient windshield construction for enclosed automobiles that is thoroughly weather-proof and which is comparatively simple and may be readily and economically manufactured; which is very neat and attractive in appearances; which is very substantial and durable, and the fit of which is unaffected by any twisting or warping of the frame of the automobile body incident to continued use.

In the attainment of these ends I form integral with the metal sheeting which encases the front frame of the body the outer or exposed side of the glass receiving channel of the windshield and I effectively seal the joint between the glass and such side of the channel to the end that there is in effect a continuity between the body and the glass that is devoid of leaky joints. This applies more particularly to the stationary lower sash of the windshield. As to the upper hinged sash, this, when in closed position, is rendered weather-proof by its lateral edges engaging compressible material that is supported within a channel formed integral with and as a continuation of the sheet metal covering of the adjacent frame portion.

The objects above enumerated with others hereinafter appearing are attained in the embodiment of my invention illustrated in the drawing accompanying and forming a part hereof and wherein Fig. 1 is a partial front elevation of an enclosed automobile body the windshield whereof is constructed in accordance with my invention; Fig. 2 is a vertical section through the windshield on the line 2—2 of Fig. 1; while Figs. 3 and 4 are sectional details on the respective correspondingly numbered lines of Fig. 2.

The body frame which defines the windshield opening is constructed of uprights 1 that are connected together at their upper ends by a beam 2 and immediately below the windshield opening by a cross member 3. The sheet metal covering 5 that is applied to the outer side of the cross member 3 is turned inwardly above said member, as shown at 6, and then upwardly, as at 7, and thence over and inwardly upon itself along the inner sides of the portions 6 and 7 to reinforce such portions. An angle bar 8 has one of its flanges underlying the portion 6 while its other flange is parallel to and is spaced a suitable distance from the portion 7 to effect a channel 9 which receives the edge portion of the glass pane 10 of the lower sash of the windshield. A filler strip 11 of wood or the like is placed within the bottom of the channel 9 to support the glass pane and serve as a shock absorber therefor. To effectively seal the joint between said pane and the side walls of the channel 9, a binding 12 of felt, saturated with varnish or other substance of similar qualities, is wrapped about the edge of the pane before the same is inserted into the channel.

Precisely the same construction as that above described is followed at the sides of the windshield upwardly from the bottom to about the plane of the upper edge of the pane 10, the sheet metal covering $5^a$ of the uprights 1 being formed the same as the edge portion of the covering 5, as will be seen by reference to Fig. 4. The parts in the side construction correspond to those of the bottom construction and are designated by like reference numerals augmented by the exponent "a."

Above the top plane of the lower sash, the edge portions of the sheet metal coverings $5^a$ of the uprights 1 are extended inwardly, as shown at 15 in Fig. 3, and at their rear edges are turned laterally and forwardly to provide channels 16 within which bumper strips 17 of rubber or the like are secured. Preferably the holding portions of the strips 17 are normally wider than the channels 16 so that they are sufficiently compressed within the channels to produce enough tension to securely hold them in place. The top pane 18 of the windshield is fitted with a frame 19 of usual construction thus forming a sash that is hinged at 20 to the beam 2, and when the top sash is closed it engages along its lateral edges the bumper strips 17. A weather strip 22 is applied to the upper edge of the bottom pane 10 for cooperation with the lower edge portion of the top pane 18 to close the joint between the panes when the upper sash is closed.

The upper sash is adapted to be held in any adjusted position by means of the usual contrivance shown at 25, and to facilitate adjustment, the upper sash is provided with finger holds 26.

I claim:

1. In automobile body construction, the combination with frame members defining the windshield opening, of a sheet metal covering having its edge portion extended over the inner sides of said members and then turned inwardly in a plane substantially parallel to that of the windshield, an angle piece having one of its flanges underlying said extended portion of the covering and the other flange spaced from said inwardly extended portion thereby to effect a channel, and a glass pane having its edge engaged within said channel.

2. In automobile body construction, the combination with frame members defining the windshield opening, of a sheet metal covering for said members having its edge portion extended over the inner sides of said members and then inwardly in a plane substantially parallel with that of the windshield, an angle piece having one of its flanges underlying said extended edge portion and its other flange spaced from and substantially parallel to the inwardly extended portion of the covering to effect therewith a channel, a glass pane having its edge within the channel, and a binder of sealing material interposed between the edge portion of the pane and the opposed walls of the channel.

3. In automobile body construction, the combination with frame members defining the windshield opening, of a sheet metal covering for said members having its edge portion extended over the inner sides of said members and then inwardly in a plane substantially parallel with that of the windshield, an angle piece having one of its flanges underlying said extended edge portion and its other flange spaced from and substantially parallel to the inwardly extended portion of the covering to effect therewith a channel, a strip of suitable material disposed in the channel, and a glass pane having its edge within the channel and supported by said strip.

4. In automobile body construction, the combination of a frame defining the windshield opening, a sheet metal covering for said frame having an edge portion extended over the inner side of the frame and then inwardly in a plane substantially parallel to that of the windshield, said edge portion being turned inwardly and back upon itself to reinforce such portion, an angle strip having one of its flanges disposed between the edge portion of the covering and the inner side of the frame while its other flange is spaced from and is substantially parallel to said inwardly extended portion of the covering to provide therewith a channel, and a windshield pane having its edge engaged within the channel.

5. In an automobile body construction, the combination of a frame defining the windshield opening, a sheet metal covering for said frame, said covering being formed over the inner edge of the frame with its edge portion extended inwardly in a plane substantially parallel to that of the windshield, said edge portion then being turned inwardly and back upon itself and under the part overlying the inner edge of the frame, an angle strip having one of its flanges engaged between the frame and said overlying portion of the covering while its other flange is spaced from and is substantially parallel to said inwardly extended portion to provide therewith a channel, and a glass pane having its edge portion sealed within said channel.

6. In an automobile body construction, the combination of a frame defining the windshield opening, a sheet metal covering for, and extending over the inner edge of, the frame and having its edge portion turned laterally and then forwardly to form a channel, a bumper strip of compressible material having a part confined within said channel, and a windshield sash hinged to the frame and arranged to engage said bumper strip when in closed position.

In testimony whereof, I hereunto affix my signature.

CARL E. DAWSON.